United States Patent [19]

Kao

[11] 4,217,029
[45] Aug. 12, 1980

[54] INTERLOCKING PRECISION OPTICAL FIBER CONNECTOR OR SUPPORT

[75] Inventor: Charles K. Kao, Roanoke, Va.

[73] Assignee: International Telephone and Telegraph Corporation, New York, N.Y.

[21] Appl. No.: 892,249

[22] Filed: Mar. 31, 1978

[51] Int. Cl.² .............................................. G02B 5/14
[52] U.S. Cl. .................................................. 350/96.21
[58] Field of Search .................. 350/96.20, 96.21, 96.22

[56] References Cited

U.S. PATENT DOCUMENTS

| 3,734,594 | 5/1973 | Trambarulo | 350/96.21 |
|---|---|---|---|
| 3,989,567 | 11/1976 | Tardy | 350/96.21 X |
| 4,019,241 | 4/1977 | Logan | 350/96.21 X |
| 4,026,633 | 5/1977 | Crick | 350/96.21 |
| 4,047,796 | 9/1977 | Kao et al. | 350/96.21 |
| 4,050,781 | 9/1977 | Beuhaire | 350/96.21 |
| 4,056,305 | 11/1977 | McCartney et al. | 350/96.21 |
| 4,057,322 | 11/1977 | Kao | 350/96.29 |
| 4,061,416 | 12/1977 | Steward | 350/96.21 |
| 4,090,778 | 5/1978 | Phillips et al. | 350/96.21 X |
| 4,093,341 | 6/1978 | Crick | 350/96.21 |
| 4,094,580 | 6/1978 | Cook et al. | 350/96.21 |
| 4,099,832 | 7/1978 | Warner | 350/96.21 |
| 4,123,139 | 10/1978 | Sandahl | 350/96.21 |

FOREIGN PATENT DOCUMENTS

| 2602661 | 7/1977 | Fed. Rep. of Germany | 350/96.21 |
|---|---|---|---|
| 2316611 | 1/1977 | France | 350/96.21 |

*Primary Examiner*—John K. Corbin
*Assistant Examiner*—John D. Lee
*Attorney, Agent, or Firm*—John T. O'Halloran; Peter C. Van Der Sluys

[57] ABSTRACT

A first optical fiber end is precisely aligned in the interstice between a plurality of relatively equal diameter cylindrical rods. The rods are of disparate lengths and the fiber as located in the interstice has its tip accurately aligned with respect to a reference surface of one of the rods. The alignment of the fiber in this manner permits a similar rod arrangement to interlock with the above described structure to enable a similarly supported fiber to be accurately positioned with respect to the first fiber due to the interlocking of the respective rod assemblies.

12 Claims, 7 Drawing Figures

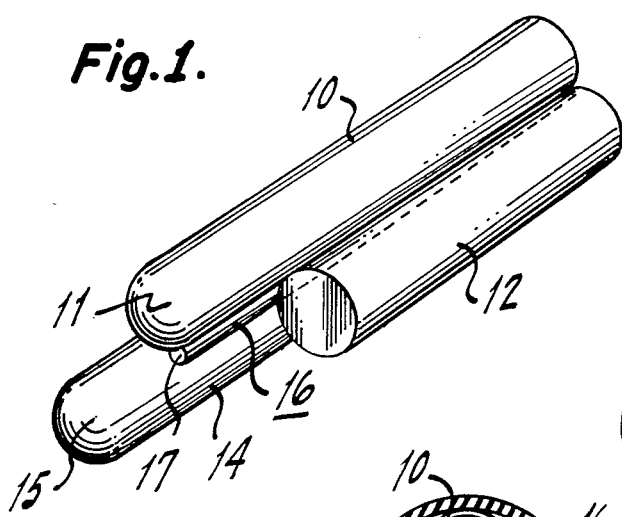
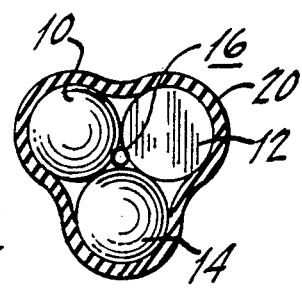
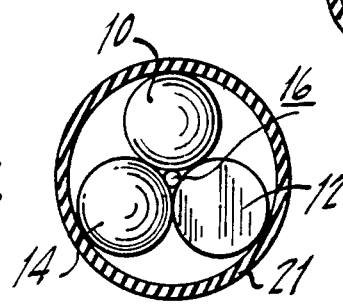
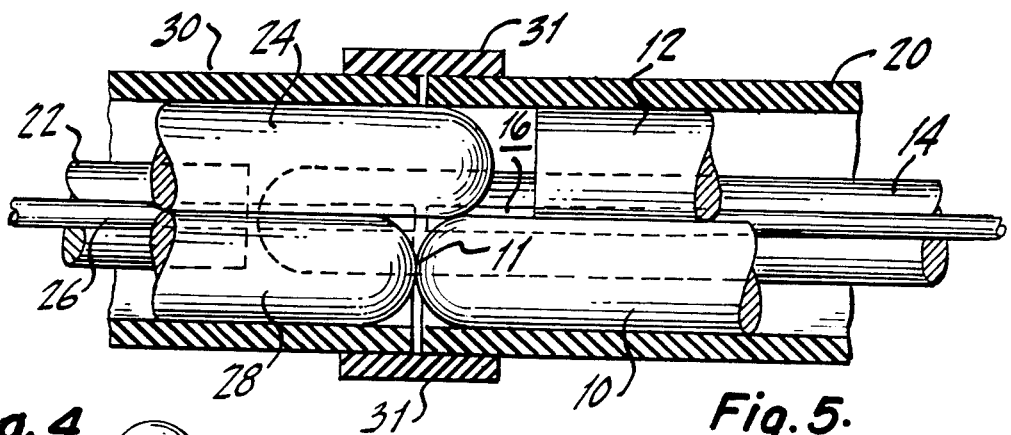
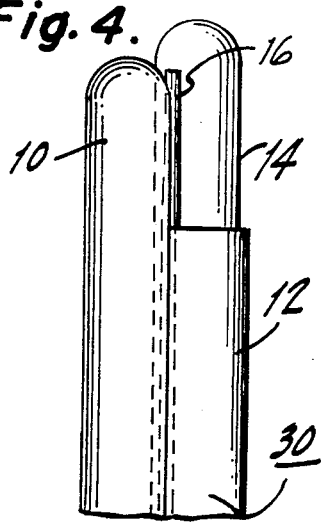
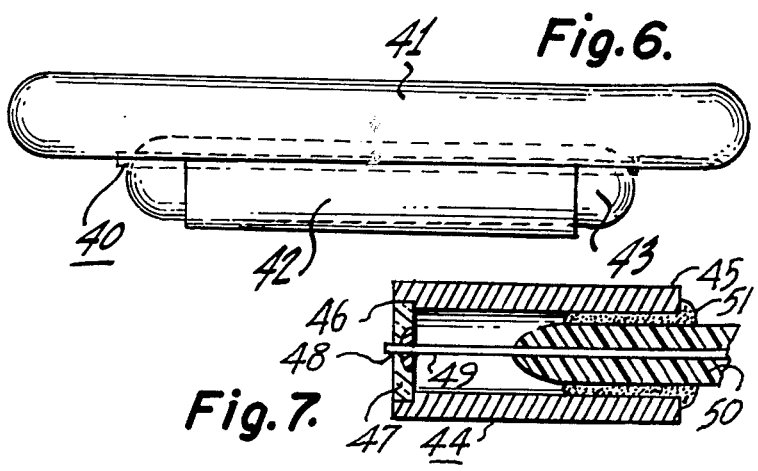

INTERLOCKING PRECISION OPTICAL FIBER CONNECTOR OR SUPPORT

BACKGROUND OF THE INVENTION

This invention relates to optical fiber connectors and more particularly to an interlocking connector or support assembly for an optical fiber cable. In order to reduce light losses between corresponding optical fibers, the fiber must be precisely aligned both axially and angularly in order to acheive optimum coupling of light energy from one fiber to another. Substantial losses may be introduced due to the improper alignment of one cable with respect to another. The problem becomes more significant when dealing with optical fibers of small diameter central cores.

Thus, the prior art has been concerned and continues to be concerned with providing a precision connector enabling one to accurately align optical fibers in a transmission system. The prior art connectors disclose a number of embodiments for joining two cables.

An example of one particular approach is shown in U.S. Pat. No. 3,734,594 entitled OPTICAL FIBER CONNECTOR issued on May 22, 1973. This connector employs a deformable annular core having pressure plates at both ends. The fiber ends are inserted into the core and a force on the plates deforms the core to align and secure the fibers.

Other devices which are employed as connectors have been described in U.S. Pat No. 4,047,796 issued on Sept. 13, 1977 entitled PRECISION OPTICAL FIBER CONNECTOR which is assigned to the assignee herein. In this apparatus, optical fiber ends are aligned and coupled together in the interstice between a plurality of cylindrical rods. The rods are mounted along and around the fibers. The patent includes means for expanding the interstice to inset the fibers and for clamping the rods in position to surround the fibers.

Still other approaches as shown in U.S. Pat. No. 4,057,322 entitled PRECISION SURFACE OPTICAL FIBERS issued on Nov. 8, 1977 and assigned to the Assignee herein depict apparatus and techniques for forming a precision surface enabling one to clad an optical fiber. The surfaces thus formed provide a plurality of reference planes. These reference planes serve to coact with precision rods or supporting structures to assure alignment of the optical fiber which is contained within the cladding material. The cylindrical surfaces formed by the rods provide carefully defined reference surfaces for aligning the fiber optic cores when similarly formed fibers are used in a common transmission system.

Essentially, the use of three rods which are fabricated to have close tolerances for providing an interstitial space has been disclosed in the prior art as providing a highly accurate guide for small diameter glass optical fibers.

It is, of course, understood that a major aspect of any connector is the ability of the connector to serve as a reliable and efficient coupling device, while further providing reliable remateability. Essentially, variations in alignment can occur as a connector is disconnected and reconnected during the course of its use in a typical system. Hence, a major factor is to provide a connector which is capable of being connected and disconnected without substantial losses in tolerance to thus eliminate the need for other precision elements in assuring that the connector continues to function to properly align the fiber optic cable.

It is therefore a purpose of this invention to provide a precision registration system which can accurately and reliably position and support an optical fiber. The apparatus depicted eliminates the need of auxilliary alignment structure, while further providing a reliable and efficient connection between optical fibers to enable repeated disconnection and reconnection of the same.

BRIEF DESCRIPTION OF PREFERRED EMBODIMENT

An optical fiber support apparatus comprises a plurality of like diameter cylindrical rods positioned longitudinally and having adjacent circumferential contacting surfaces providing an interstitial space between said rods, at least one of said rods in said plurality being of a disparate length with respect to said others and having a front surface configuration defining a reference point, an optical fiber positioned within said interstitial space with the end of said fiber accurately positioned at a predetermined location with respect to said reference point on said front surface of said disparate length rod.

BRIEF DESCRIPTION OF THE DRAWINGS

FIG. 1 is a perspective view of a novel arrangement of cylindrical rods of disparate lengths supporting an optical fiber in the interstitial space.

FIG. 2 is an end view of an optical fiber supported by a rod assembly as shown in FIG. 1 including an elastomeric sleeve retaining member.

FIG. 3 is an alternate embodiment showing another technique of supporting a rod and cable structure.

FIG. 4 is a top view of a rod assembly according to FIG. 1.

FIG. 5 is a side view partially in cross-section depicting a connector arrangement formed by the coaction of two rod assemblies according to FIG. 1.

FIG. 6 is a top view of a rod assembly according to this invention showing a back to back connector configuration.

FIG. 7 is a cross-sectional view showing another embodiment of the present invention.

DETAILED DESCRIPTION OF THE INVENTION

Referring to FIG. 1, there is shown a plurality of cylindrical rods designated respectively as 10,12 and 14. Each rod is of the same diameter and are precisely fabricated so that the diameters do not deviate one from the other by more than a mil or so. Techniques for machining or grinding such rods are known in the art and to provide such rods as 10,12 and 14 of approximate equal diameter is well within the scope of present day technology.

The supporting rods as 10,12 and 14 may be fabricated of many suitable materials such as stainless steel, ceramic as well as certain plastic materials. Such materials can be accurately machined to required tolerances to produce an array of equal diameter rods. It is known that three rods of high precision (equal diameter to plus or minus one mil) is sufficient to provide an interstitial space of at least plus or minus 0.1 mil.

The rods 10,12 and 14 are arranged in a close package as shown in FIG. 1 and the fiber 16 is located within the interstitial space formed by the rod configuration with the circumferential surfaces in contact. This interstitial space forms a highly accurate guide for small diameter fibers as 16. Of course, it is to be understood that the fiber 16 must be bare and any jacket material must be stripped back beyond the rods.

If reference is made to the above cited patent, U.S. Pat. No. 4,047,796, the geometry as well as the relationship in forming the interstitial space is clearly and precisely described. The patent further shows techniques of adjusting the size of the interstice between the rods to thereafter clamp or otherwise secure the assembly in a packed array.

Referring to FIG. 2, there is shown an array of three rods as 10,12 and 14 contained within an elastomeric pressure tube or pressure member 20. The elastic pressure tube is a conventional technique used in securing three rods or similar structures in a closely packed array. The tube 20 exerts the necessary forces on the rods to maintain compactness to assure that the fiber 16 is optimumly oriented. Examples of various techniques of restraining a rod configuration in the manner depicted in FIG. 2 are well known within the state of the art and suitable plastics or elastomeric materials are readily available.

If reference is made to FIG. 3, there is shown still another technique for securing the three rods in a compact array. An example of this technique may be had by referring to U.S. Pat. No. 4,047,796 which further provides for adjustibility of the array.

In any event, it is clear that the rods can be stacked as shown and described to properly support an optical fiber as 16. Thus, the technique shown in FIG. 3 may employ a compression ring as 21 or other suitable assembly to maintain the geometry between the rods as described.

Referring to FIG. 1, it is apparent that the rods 10,12 and 14 are of disparate lengths. Thus, the FIGURE depicts a short rod 12, a rod of intermediate size 10 and a long rod 14. As indicated above, each of the rods 10,12 and 14 are of the same relative diameter.

The intermediate rod 10 has a front surface 11 which is accurately machined in a hemispherical shape. The long rod 14 also has a hemispherical front surface configuration, while the short rod 12 has a relatively flat front surface.

The optical fiber 16 is placed parallel to the interstitial region formed by the juxtaposed rods. Essentially, the fiber 16 has its front end 17 within a desired distance from the tip of the intermediate length rod 10. The fiber 16 may accurately be aligned with the tip of the rod 10 and then bonded thereto so that the position of the tip 17 of the fiber is completely and accurately determined with respect to the surface 11 of the intermediate rod 10.

To further assure such alignment, the fiber may be bonded to the short rod 12 as well. The tip 17 of the fiber which is accurately aligned with respect to the tip or outermost surface of the rod 11 is finished or treated by a score and pull technique which is known in the optical fiber art. The long rod 14 extends beyond rods 12 and 10 as shown.

Referring to FIG. 4, there is shown a top view of a rod array according to FIG. 1. It is seen that the rods are in alignment at the back surface plane 30 and are retained in this manner by means of the suitable sleeve arrangement as depicted in FIGS. 2 and 3.

The entire assembly thus described serves both as a support for the fiber 16 and as a connector to enable one to couple a fiber 16 to another fiber by means of the apparatus thus described.

Referring to FIG. 5, there is shown a first and a second coupling apparatus in an interlocked position. Essentially, as indicated the connector assembly consists of three cylindrical rods 10,12 and 14 supporting the fiber 16 in the interstice. As indicated above, the fiber 16 is placed parallel to the interstitial region formed by the three rods. The end of the fiber is accurately located to be within a desired distance in relation to the tip formed on the hemispherical surface 11 of the intermediate length rod 10. The fiber 16 may be bonded to both the short rod 12 and the intermediate length rod 10 to further assure accurate alignment and to prevent relative movement of the fiber 16 with respect to the closely packed rod array. A second identical assembly consists of a closely packed array comprising a long rod 24, an intermediate rod 28 and the short rod 22. As described above, both the intermediate rod 28 and the long rod 24 also have a hemispherical surface.

An optical fiber 26 is located parallel to the interstitial region formed by the rods 22,24 and 28 and the tip of the fiber 26 is accurately located with respect to the tip or end of the hemispherical surface associated with the intermediate length rod 28.

As indicated above, both rod assemblies may be surrounded by a suitable elastic pressure tube as 20 and 30 respectively in order to provide the necessary forces to maintain assembly compactness. In any event, the connecting scheme may be employed as a ferrule and a single pressure tube may be employed to restrain both assemblies. In a similar manner, an additional restraining tube as 31 may be placed about the juncture of the two rod connecting assemblies, if desired.

It is, of course, understood that there are many ways of providing protective and restraining coverings for such rod assemblies in order to maintain compactness within desired mechanical tolerances.

As seen from FIG. 5, the long rod 14 associated with the fiber 16 is adjacent to but not in contact with the short rod 22 associated with fiber 26. Similarly, the long rod 24 associated with fiber 26 is adjacent to but not in contact with the short rod 12 associated with fiber 16. As seen from the FIGURE, the intermediate length rods 10 and 28 are in contact. As is well known, due to the fact that each rod as 28 and 10 possesses a hemispherical surface, the contact is at a single point directly at the center of the respective hemispheres. This aspect is well known in regard to geometrical considerations concerning hemispherical surfaces.

Since the intermediate length rods 10 and 28 are in contact, it is seen that the respective fibers 16 and 26 which were accurately aligned with respect to the predetermined contact point of each rod 10 and 28, face each other and are separated by a predetermined distance. The fibers, based upon alignment procedures, may actually be in contact or separated by an extremely small distance. The front surfaces of each fiber are essentially facing each other in complete congruency to therefore acheive optimum light coupling from one fiber to the other.

In regard to the accuracy obtainable with the rod structure, it is known that if the diameters of the rods are maintained relatively equal within one unit of distance by controlled machine processes, then the interstitial space provides a fiber axial alignment of better than 0.1 per unit. In order to assure proper accuracy of alignment, the Z axis reference is set during the fabrication procedure. In this manner, the fibers 26 and 16 to be coupled are positioned within their respective rod assemblies with respect to a reference support. The end of the support serves as a reference point. The fiber ends are set within the rod assemblies at a defined distance with respect to one another during the alignment of the fibers with the tip of the respective intermediate length rods. The alignment procedure, of course, can also be accommodated after the fibers are inserted into a respective rod assembly by referencing the end of the fiber with the tip of the intermediate length rod and then by permanently positioning the fibers so that the tips are in perfect alignment in all directions on a proper support plane.

It is immediately apparent that the structure thus described provides an optimum interlocking mechanism for fibers 16 and 26 assuring that the fibers are in an optimum position with respect to one another for the efficient transmission and coupling of light energy therebetween.

It is further noted that the interlocking mechanisms thus described provide a positive connect and disconnect function for the connector. Since the tips of the intermediate rods are in contact at a single point, the connector is capable of being disconnected and reconnected without sacrificing mechanical alignment of the fibers. Each connector thus described will be completely compatible with other connectors supporting fibers of the same relative diameters, as the connectors are fabricated from similarly machined rods and assembled and aligned on appropriate reference supports. The connector thus described also provides a relatively strong mechanical interlock which restrains lateral forces at the coupling juncture due to the disparate lengths of the respective rod assemblies.

The assembly thus described eliminates the necessity for external precision alignment mechanisms which are required in many of the prior art connectors.

The aspects of the present invention for use as connectors and ferrules for supporting fibers are many and one can envision many alternate arrangements of such structure.

Referring to FIG. 6, there is shown a top view of a rod assembly which provides a back to back connector mechanism for a fiber 40 located in the interstitial space formed by the three-rod structures.

A first rod 41 is positioned and dimensioned to provide a long rod as rod 14 of FIG. 1. The rod 41 is machined at both ends to have the hemispherical surface. A short rod 42 is shown and an intermediate rod 43 is also machined at both ends.

The fiber 40 is supported within the assembly of FIG. 6 as described above and the ends of the fiber are accurately aligned with respect to the end tips of the intermediate rod 43. The structure of FIG. 6 provides a back to back connection ability and hence, one may couple a suitable connector assembly at both the right and left sides of the structure depicted in FIG. 6.

Thus, as can be seen, the employment of such connectors can accommodate communication system requirements enabling one to employ a plurality of fibers to form a suitable transmission link with the connectors, thus providing coupling of fibers in an efficient and precise manner.

While the above embodiments have been described as connecting a bare optical fiber 16, it is contemplated that the present invention may also be used to connect an optical fiber that may be encased in a precision jacket wherein the jacket thickness is controlled to the desired degree of accuracy. Further, it is contemplated that the optical fiber to be connected may first be mounted in a ferrule containing a watch jewel for accurate positioning of the optical fiber within an opening formed in the watch jewel.

Referring to FIG. 7, there is shown a precision ferrule 44 preferably manufactured of stainless steel with the diameter of the outer surface 45 being accurately controlled. An accurate central recess 46 is formed in one end of the ferrule and a watch jewel 47 is interference fitted into the recess 46. It is contemplated that the ferrule 44 will be provided in a standard size common to all fiber sizes and that the watch jewel insert 47 will also have a standard outside diameter for the interference fit with recess 46. An opening 48 is accurately formed in the center of the watch jewel insert 47 and a range of opening sizes may be provided from typically 50 microns to over 200 microns incrementing in steps of approximately 10 microns. The watch jewel insert is manufactured to a high degree of accuracy and the addition of this extra component only impairs the overall concentricity by a maximum of 1.5 microns. The use of a watch jewel insert in the ferrule means that an accurate small hole can be fitted into a larger hole accurately bored, whereas a small hole required for the fiber would be difficult to machine into the ferrule directly with sufficient accuracy or at low cost.

An optical fiber 49 having a jacket 50 of preferably plastic material is fitted into the ferrule with a bared end of the fiber 49 protruding through the jewel hole. The jacket is glued to the ferrule using a standard epoxy resin adhesive 51 and the tip of the bare fiber 49 is retained in the hole in the watch jewel insert using standard epoxy resin adhesive. The tip of the fiber is then polished to be flush with the end of the ferrule using conventional polishing means and grit sizes to obtain a blemish-free surface when viewed at a magnification of up to 400X.

The ferrule mounted optical fiber may then be accurately connected using the three-rod arrangement of the present invention as shown in FIG. 5 in which case the rods must, of necessity, be of a larger diameter to provide an interstitial space sufficient to receive the ferrule 44.

What is claimed is:

1. An optical fiber support apparatus, comprising:
   first, second and third cylindrical rods of like diameter positioned parallel to an axis and having adjacent circumferential contacting surfaces providing an interstitial space between said rods, said rods terminating at front end surfaces, said first rod having a front end surface extending beyond the front end surfaces of said second and third rods, said second rod having a front end surface configuration defining a reference point, said third rod having a front end surface located a greater distance from said front end surface of the first rod than the distance from the reference point to the front end surface of the first rod; and
   an optical fiber positioned within said interstitial space, with the end of said fiber accurately positioned at a predetermined location with respect to the reference point of said second rod.

2. The fiber support apparatus according to claim 1, wherein said second rod has a hemispherical front end surface defining said reference point.

3. The fiber support apparatus according to claim 1, wherein said first, second and third rods are employed in a first connector configuration for coacting with a second corresponding connector, said second connector comprising a second group of first, second and third cylindrical rods of like diameters corresponding to those of said first connector configuration, said second group of rods providing an interstitial space for receiving a second optical fiber, with one of said rods having a front surface defining a reference point corresponding to the reference point of said first connector configuration, said second optical fiber having an end accurately positioned with respect to said second reference point, whereby said first connector configuration coacts with said second connector configuration so that the associated rods coact at said respective reference points to cause the optical fibers to face one another at a predetermined separation according to said position of said fibers with respect to said reference points.

4. The fiber support apparatus according to claim 1 further including means surrounding said rods to retain the same in a closely packed array.

5. The fiber support apparatus according to claim 4 wherein said means surrounding said rods comprises an elastomeric sleeve.

6. The fiber support apparatus according to claim 1 wherein said fiber is bonded to at least one of said rods within said interstitial space.

7. The fiber support apparatus according to claim 1 wherein said first rod has a hemisphereical front end surface.

8. The fiber support apparatus according to claim 1 wherein said plurality of rods are fabricated from a material capable of being accurately machined, such as stainless steel.

9. The fiber support apparatus according to claim 1, wherein the optical fiber engages the circumferential contacting surfaces of each of the cylindrical rods and is supported thereby.

10. The fiber support apparatus according to claim 1, wherein the optical fiber is mounted within a ferrule, said ferrule being positioned within the interstitial space between the cylindrical rods.

11. The fiber support apparatus according to claim 10, wherein the ferrule includes a watch jewel insert having a hole formed centrally therein with the optical fiber being mounted in said hole.

12. The fiber support apparatus according to claim 11, wherein the optical fiber includes a jacket terminating at a position along the optical fiber remote from the end thereof, said jacket being fixed to an internal surface of the ferrule and the end of the optical fiber being mounted in the hole of said watch jewel insert.

* * * * *